(12) United States Patent
Dotan et al.

(10) Patent No.: US 6,199,473 B1
(45) Date of Patent: Mar. 13, 2001

(54) GRILLING APPLIANCE

(75) Inventors: Simon Dotan, Natania; Offer Parezki, Rishon Lezion, both of (IL)

(73) Assignee: Home Care Technologies, Ltd. (HK)

( * ) Notice: Subject to any disclaimer, the term of this patent is extended or adjusted under 35 U.S.C. 154(b) by 0 days.

(21) Appl. No.: 09/479,659

(22) Filed: Jan. 10, 2000

(51) Int. Cl.$^7$ .............................. A47J 37/00; A47J 37/04
(52) U.S. Cl. ................................ 99/332; 99/341; 99/390; 99/419; 99/421 V; 99/426; 99/427; 99/446
(58) Field of Search ..................... 99/325–333, 334–336, 99/337, 339, 340, 341, 352, 375, 390, 395, 397, 400, 401, 443 R, 419–421 V, 425–427, 444–446, 447–450, 451; 126/25 R, 9 R; 219/400, 385, 386, 392, 388, 389; 426/523; 392/416, 423, 425, 428

(56) References Cited

U.S. PATENT DOCUMENTS

| | | | | |
|---|---|---|---|---|
| 1,612,252 | * | 12/1926 | Beverly | 99/421 V |
| 1,819,301 | * | 8/1931 | Noble | 99/419 |
| 1,993,353 | * | 3/1935 | Young | 99/337 |
| 2,581,570 | * | 1/1952 | Amanatides | 99/421 V |
| 2,687,080 | * | 8/1954 | Dorin | 99/332 |
| 2,897,776 | * | 8/1959 | Black et al. | 99/419 |
| 4,270,444 | * | 6/1981 | Geissmann | 99/421 P |
| 4,715,273 | * | 12/1987 | Riesselmann | 99/427 X |
| 4,810,856 | * | 3/1989 | Jovanovic | 219/401 |
| 5,106,642 | * | 4/1992 | Ciofalo | 426/523 X |
| 5,539,184 | * | 7/1996 | Su | 219/388 |
| 5,575,196 | | 11/1996 | Masel et al. . | |
| 5,665,258 | * | 9/1997 | Hsu | 219/386 X |
| 5,907,994 | | 6/1999 | Dotan . | |

* cited by examiner

Primary Examiner—Timothy F. Simone
(74) Attorney, Agent, or Firm—Benjamin Barish

(57) ABSTRACT

A grilling appliance includes a housing defining an internal grilling compartment for receiving food articles to be grilled; an impaling member mounted within the grilling compartment for impaling a food article to be grilled; a circular array of electrical heaters surrounding and spaced from the impaling member for heating a food article when impaled thereon; and an electrical system for sequentially energizing the electrical heaters to produce a rotating heating front which rotates around a food article when impaled on the impaling member. Each electrical heater is shaped in the form of a loop extending for a part of the circumference of the grilling compartment and has a pair of mounting legs at one end joined by a U-section at the opposite end.

20 Claims, 6 Drawing Sheets

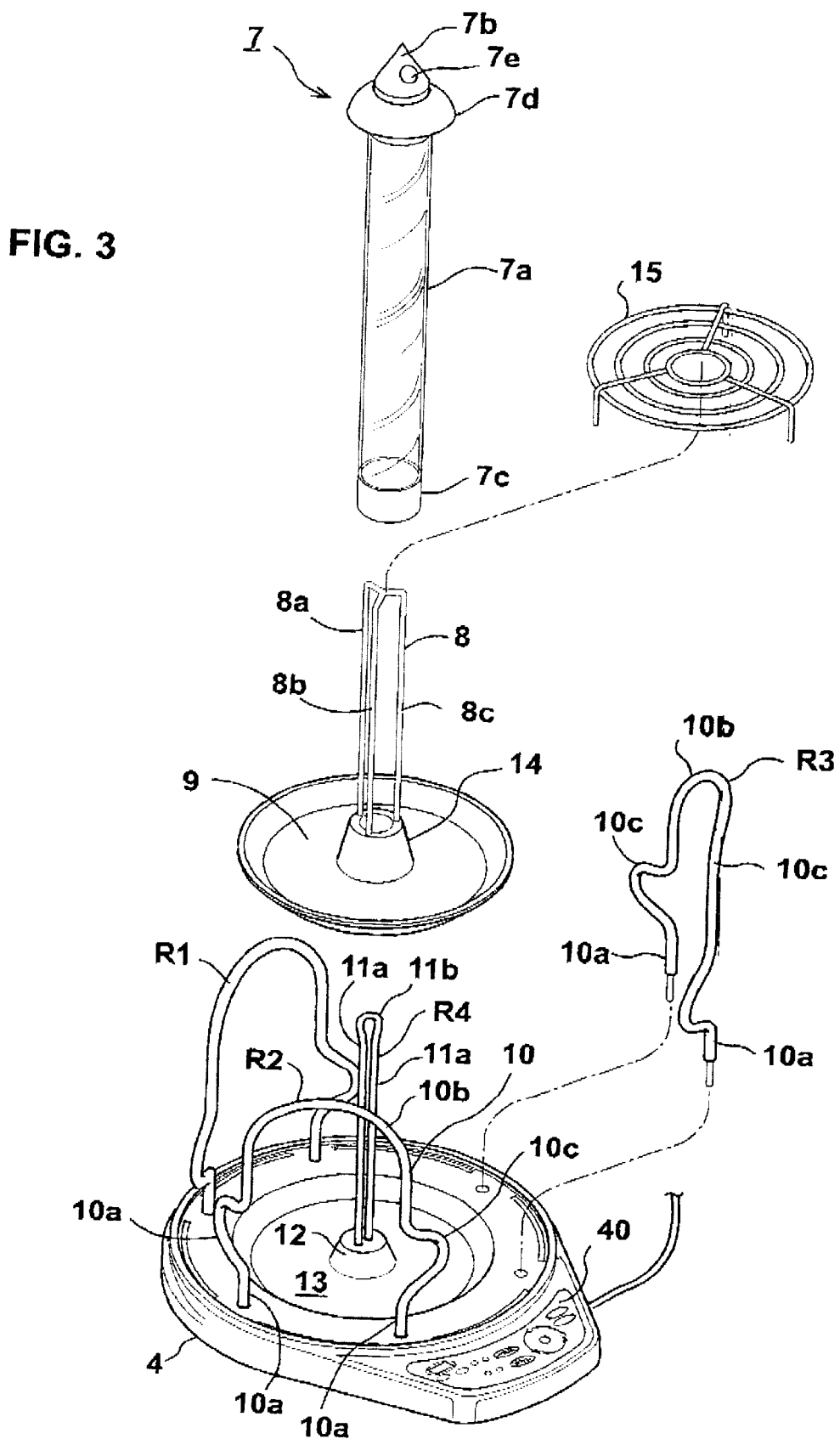

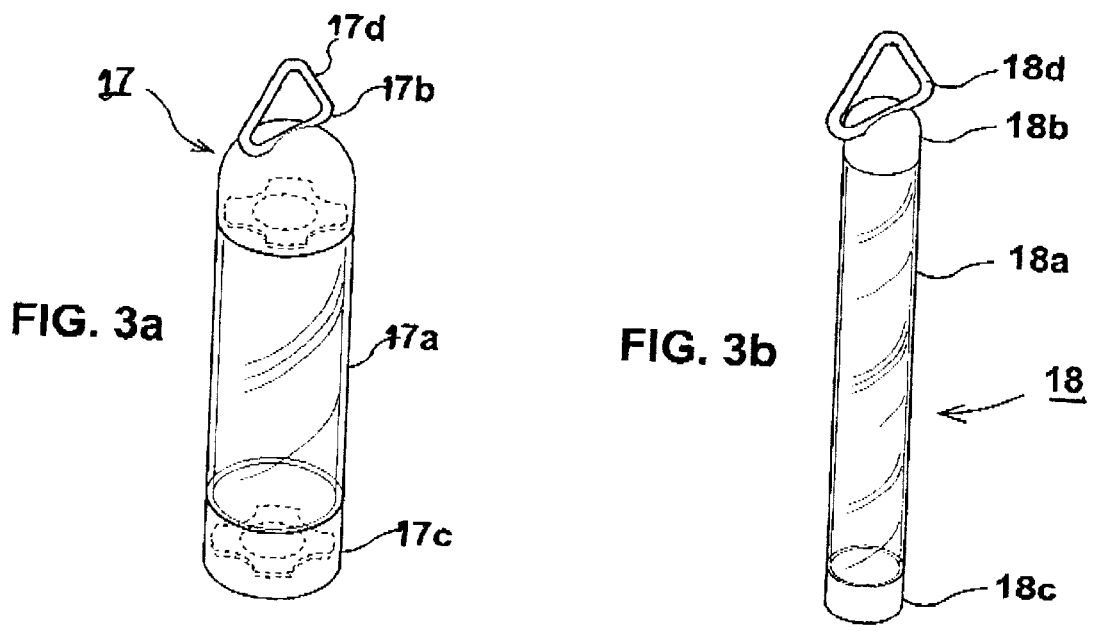
FIG. 3a
FIG. 3b
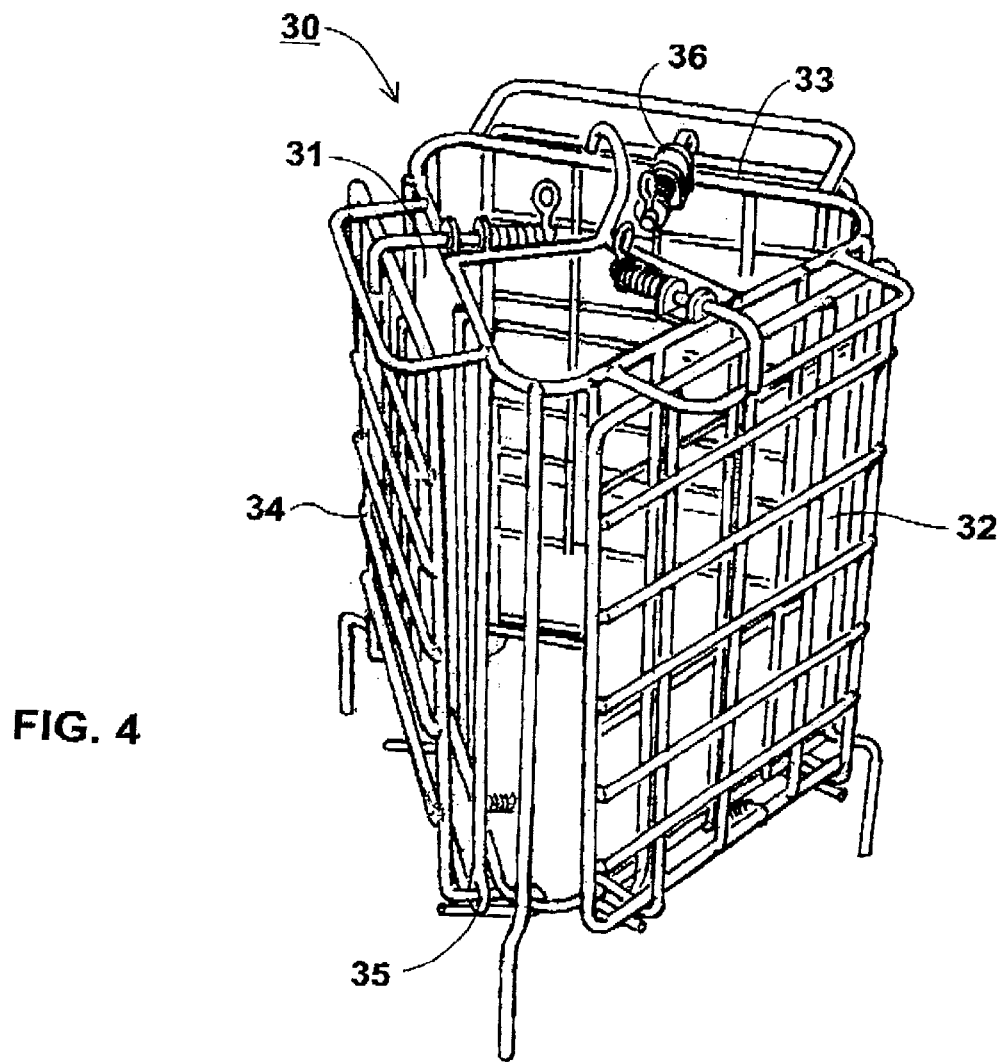
FIG. 4

GRILLING APPLIANCE

FIELD AND BACKGROUND OF THE INVENTION

The present invention relates to grilling appliances such as used for grilling various types of food articles, e.g., chicken, but also flat-type food articles, e.g., steaks, hamburgers, etc.

The present invention is particularly applicable to grilling appliances of the type which include an impaling member mounted within a grilling compartment for impaling a food article to be grilled, and a circular array of electrical heaters surrounding the impaling member for heating the food article impaled thereon. This type of grilling appliance is illustrated, for example, in U.S. Pat. Nos. 5,575,196, 4,810,856, 4,715,273, 1,819,301 and 1,612,252, and in Austrian Patent 217,592, wherein the impaling member is either stationary or is rotated within the grilling compartment with respect to the electrical heaters to evenly grill the outer surface of the food article; and in U.S. Pat. No. 5,907,994, wherein the electrical heaters are sequentially energized to produce a rotating heating front which rotates around the food article to evenly grill its outer surface.

OBJECTS AND BRIEF SUMMARY OF THE INVENTION

The present invention is directed primarily to the type of grilling appliance illustrated in U.S. Pat. No. 5,907,994, and provides a number of important improvements as will be more particularly described below.

According to one aspect of the present invention, there is provided a grilling appliance, comprising: a housing defining an internal grilling compartment for receiving food articles to be grilled; an impaling member mounted within the grilling compartment for impaling a food article to be grilled; a circular array of electrical heaters surrounding and spaced from the impaling member for heating a food article when impaled thereon; and an electrical system for sequentially energizing the electrical heaters to produce a rotating heating front which rotates around a food article when impaled on the impaling member; each of the electrical heaters being shaped in the form of a loop extending for a part of the circumference of the grilling compartment and having a pair of parallel mounting legs at one end joined by a U-section at the opposite end.

According to further features in the described preferred embodiment, each of the electrical heaters is vertically mounted to the housing with its pair of mounting legs located at the lower end, and its U-section at the upper end, of the respective electrical heater. In addition, each of the electrical heaters further includes an intermediate section joining the legs and loop of the respective electrical heater and extending in the circumferential direction outwardly of the legs on both sides of the respective electrical heater. Preferably, each of the electrical heaters is an electrical resistance-heating element.

It is been found that the foregoing features enable a significant reduction to be made in the number of electrical heating elements required to produce the rotating heating front. Thus, whereas the grilling appliance illustrated in U.S. Pat. No. 5,907,994 utilized six electrical heating elements, each in the shape of a linear heating lamp, the grilling appliance of the present invention can utilize merely three electrical heating elements when constructed as described above.

According to further features in the described preferred embodiment, the appliance includes a further electrical heater centrally of the impaling member, and a mounting member having a plurality of radially-projecting legs around the further electrical heater for receiving the impaling member and for spacing it from the further electrical heater. Such a construction permits different types of impaling members to be applied, e.g., a relatively large diameter impaling member for chicken, and a relatively small diameter impaling member for beef, lamb, and the like.

According to still further features in the described preferred embodiment, the appliance further includes a cage removably mounted within the grilling compartment, in place of the impaling member, for receiving relatively flat-type food articles to be grilled. The cage includes a plurality of compartments arrayed around the circumference of the cage facing the circular array of electrical heaters, each of the compartments being configured to receive a flat-type food article and including a wall movably mounted to open and closed positions to permit introduction and removal of food articles therefrom.

The latter features enable the grilling appliance to be conveniently used for grilling flat-type food articles, such as hamburgers, steaks and the like.

Further features and advantages of the invention will be apparent from the description below.

BRIEF DESCRIPTION OF THE DRAWINGS

The invention is herein described, by way of example only, with reference to the accompanying drawings, wherein:

FIGS. 3 is an exploded view more particularly illustrating the impaling member in the grilling appliance of FIG. 1;

FIGS. 3a and 3b illustrate two other types of impaling member which may be used in the grilling appliance;

FIG. 4 illustrates a wire cage that may be used in the grilling appliance for grilling flat-type food articles, such as steaks and hamburgers;

DESCRIPTION OF A PREFERRED EMBODIMENT

Figure 1:
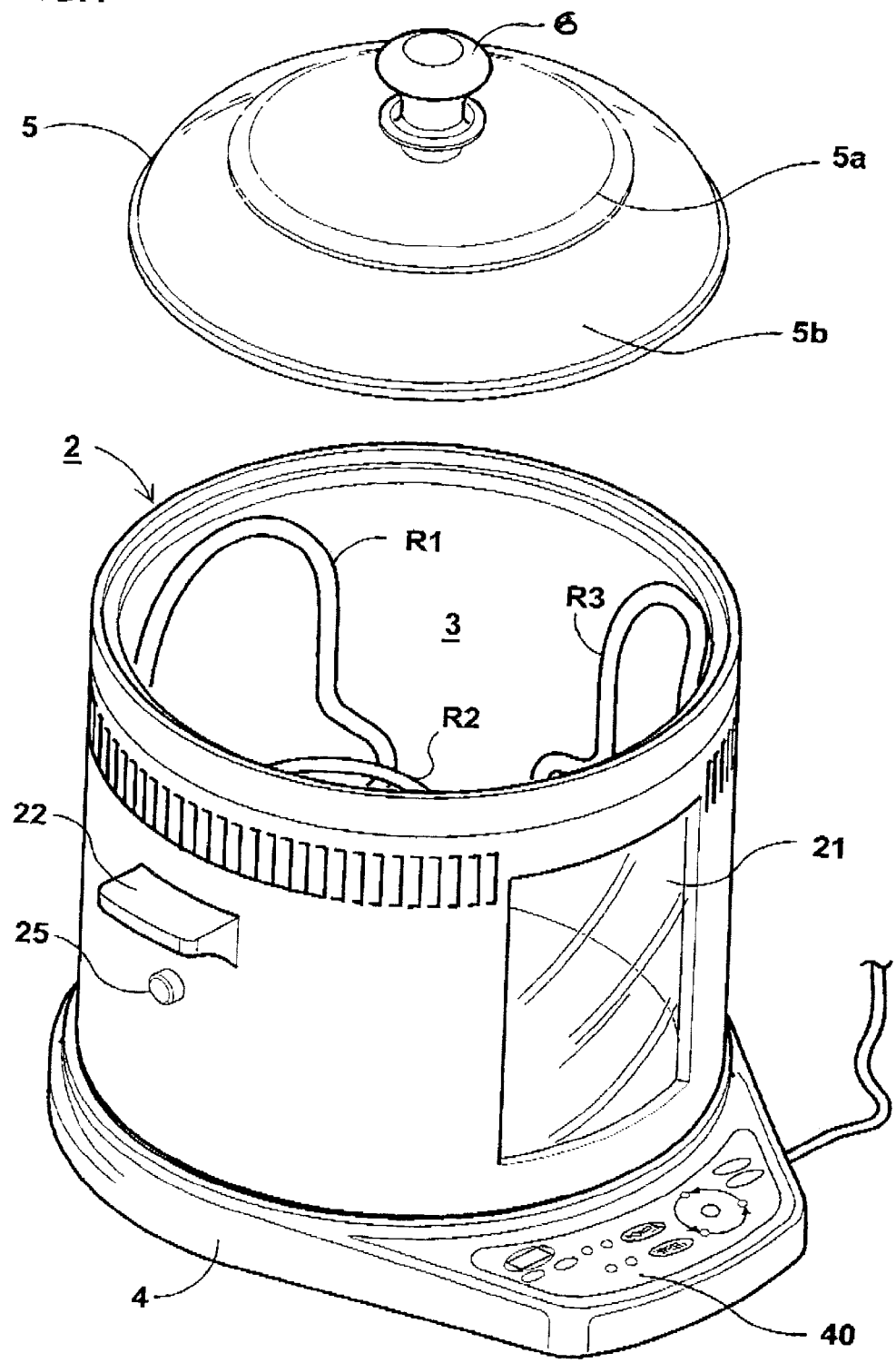
FIG. 1 is a three-dimensional view illustrating one form of grilling appliance constructed in accordance with the present invention.

The grilling appliance illustrated in the drawings includes a housing, generally designated 2, defining an internal grilling compartment 3 for receiving food articles to be grilled. Housing 2 includes a base 4 for stably supporting the appliance on a flat horizontal surface. The upper end of housing 2 is closed by a removable cover 5. Preferably, the central section 5a of cover 5 is of metal, formed with a reflector underface, and the peripheral section 5b is transparent to enable one to view the interior of the housing. The central section 5a includes a finger-grip 6 to facilitate handling the cover.

The illustrated appliance further includes a vertical impaling member 7, as shown particularly in FIG. 3, mounted centrally of the grilling compartment 3 for impaling food articles, such as chicken, to be grilled. Impaling member 7 is removably received on a vertically-extending wire mounting member 8 to overlie a drip pan 9 secured to the bottom of mounting member 8.

The food article to be grilled is heated by a circular array of electrical heaters $R_1, R_2, R_3$, surrounding and spaced from the impaling member 7 receiving the food article, and by a center electrical heater R4 enclosed within the impaling member 7.

As in the above-cited U.S. Pat. No. 5,907,994, the center electrical heater $R_4$ is continuously energized, but the circular array of electrical heaters $R_1$–$R_3$ are sequentially energized so as to produce a rotating heating front which rotates around a food article impaled on the impaling member 7 in order to uniformly grill the outer surface of the food article. However, whereas the electrical heaters in the circular array of U.S. Pat. No. 5,907,994 were linear heat lamps extending vertically of the heating compartment, in the construction of the present invention the electrical heaters $R_1$–$R_4$ are electrical resistance heating elements, rather than heat lamps, and each is shaped in the form of a loop extending for a part of the circumference of the grilling compartment.

Figure 2:
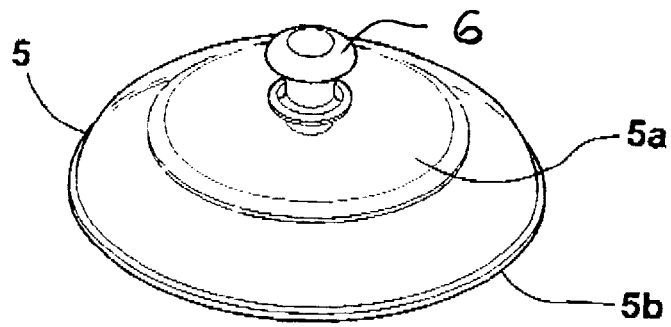
FIG. 2 is an exploded view illustrating the main components in the grilling appliance of FIG. 1.
Figure 2:
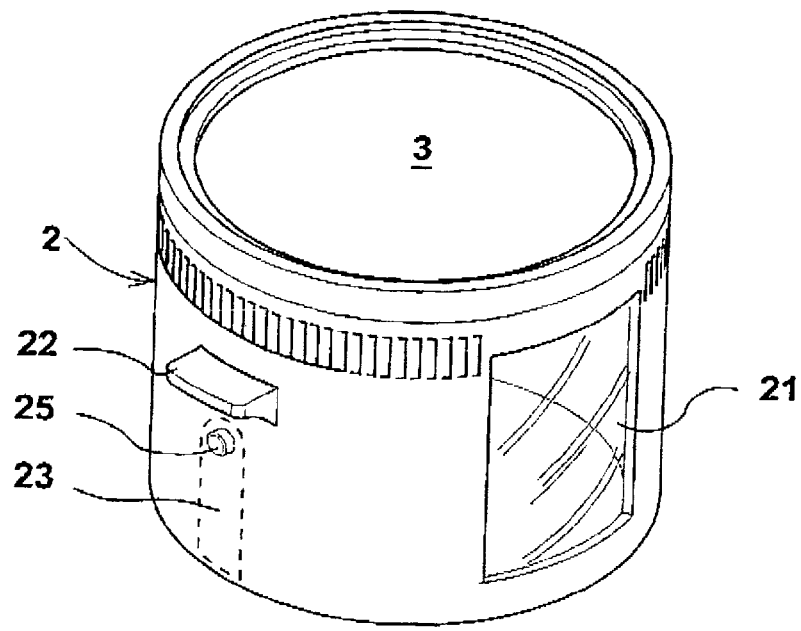
Figure 2:
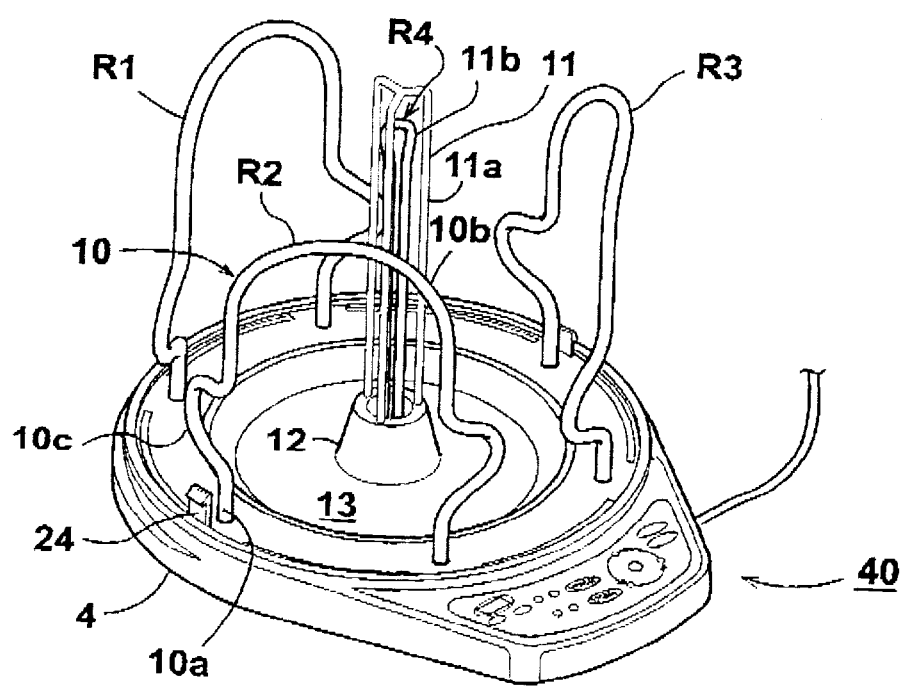

Thus, as shown particularly in FIGS. 2 and 3, each of the electrical heaters $R_1$–$R_3$ is of an omega configuration 10 and includes a pair of mounting legs 10a at one end, a U-section 10b at the opposite end, and an intermediate section 10c joining the legs with the U-section. Each electrical heater $R_1$–$R_3$ is vertically mounted to the housing base 4 with its pair of mounting legs 10a, 10b located at the lower end of the respective electrical heater, and its U-section 10b at the upper end. The intermediate section 10c joining the legs and U-section extend in the circumferential direction outwardly of the legs on both sides of the respective electrical heater.

Such an arrangement significantly decreases the number of electrical heaters required to produce the rotating heating front when the electrical heaters are sequentially energized. Thus, as shown particularly in FIG. 2, only three electrical heater elements $R_1$–$R_3$ are required in this arrangement, as compared to six electrical heaters included in the grilling appliance described in U.S. Pat. No. 5, 907,994.

The center electrical heater $R_4$ is also an electrical resistance-heating element. It is of an inverted U-configuration 11 to define two closely-spaced parallel vertical legs 11a joined at their upper ends by a loop 11b.

The center electrical heater $R_4$ is mounted on a conical pedestal 12 centrally of a cavity 13 formed in the appliance base 5. Thus, as shown particularly in FIG. 3, the wire mounting member 8 for mounting the impaling member 7 is secured to the drip tray 9 by a conical sleeve 14. Sleeve 14 is received over conical pedestal 12 in the base 4 to center the wire mounting member 8 around the central electrical heater $R_4$ and to seat the drip pan 9 within cavity 13 of the base.

The wire mounting member 8 is formed with three radially-projecting legs 8a, 8b, 8c, for supporting the impaling member 7 around the center electrical heater $R_4$. Thus, mounting member 8 spaces the impaling member 7 from the electrical heater $R_4$ and thereby prevents direct contact between the electrical heater and the impaling member.

As further shown in FIG. 3, a circular grid 15 is applied to the wire mounting member 8 to overlie the drip pan 9 so as to receive any food parts that may separate from the food article being grilled, while the drippings are permitted to drip into the pan 9.

Impaling member 7 includes a main section 7a of cylindrical configuration, open at its lower end for application over the wire mounting member 8, and closed at its upper end by a conical cap 7b for insertion with the food article to be grilled. Preferably, its main cylindrical section 7a is of a transparent heat-resistant material, while its upper cap 7b and its lower open end 7c are of metal, such as stainless steel, aluminum, or the like.

In the construction illustrated in FIG. 3, the main cylindrical section 7a of impaling member 7 is of relatively small diameter and includes a conical adapter ring 7d of larger diameter between the upper end of section 7a and the upper cap 7b. Thus, the adapter ring 7c would be included, as shown, when the grilling appliance is to be used for grilling a chicken; but when the grilling appliance is to be used for grilling other types of meat articles, such as beef or the like, the adapter ring 7d would not be included since such meat articles require impaling members of smaller diameter.

Instead of providing an impaling member, such as shown at 7 in FIG. 3, which may be adapted for use with various types of meat articles as described above, the grilling appliance may be equipped with two separate impaling members as shown in FIGS. 3a and 3b. The impaling member shown in FIG. 3a, therein designated 17, includes a relatively large diameter central section 17a for grilling chicken and the like; whereas the impaling member shown in FIG. 3b, therein designated 18, includes a smaller-diameter cylindrical section 18a for use with beef or other meat articles requiring a smaller-diameter impaling member. In both cases, cylindrical section 17a, 18a is of a transparent heat-resistant material; its upper end is closed by a metal cap 17b, 18b; and its lower open end is lined with a metal insert 17c, 18c. In addition, the upper end includes a loop 17d, 18d, to enable the impaling member, and the food article thereon, to be easily removed from the grilling compartment. A similar loop is preferably provided in impaling member 7 illustrated in FIG. 3, and for that purpose its upper cap 7b is formed with an opening 7e for receiving such a loop (not shown).

Housing 2 is made of metal or plastic but includes an inner reflecting surface facing the electrical heaters $R_1$–$R_4$. Preferably, the housing is provided with one or more transparent windows 21 to enable viewing the food article being grilled. The housing is removably attachable to base 4 by means of a pair of handles 22 projecting from the opposite side of the housing. It is retained on the base by elastic clips 23 (FIG. 2) extending vertically along its inner surface on its opposite sides, cooperable with retainers 24 on the opposite sides of base 4, and movable by release buttons 25.

In order to remove housing 2 from base 4, the user grips the two handles 22, and at the same time depresses release buttons 25 underlying each handle to release clips 23 from retainers 24, and thereby to enable the housing to be lifted off the base.

The grilling appliance illustrated in the drawings may also be used for grilling other types of food articles, such as flat steaks, hamburgers, and the like.

FIG. 4 illustrates a wire cage, therein generally designated 30, which may be mounted on the wire mounting member 8, in place of the impaling member 7 (or 17), to enable three flat-type food articles to be grilled at one time.

The wire cage 30 illustrated in FIG. 4 includes three sides in a triangular configuration with the bottom open to enable it to be removably mounted over the wire mounting member 8 in spaced relationship to the center heater $R_4$. The three sides of the wire cage 30 thus defines three compartments 31, 32, 33 facing radially outwardly towards the circular array of electrical heaters $R_1$–$R_3$. Each compartment is closed by a cover 34, pivotally mounted at its lower end 35 to open and closed positions to enable insertion and removal of a flat food article (e.g., steak, hamburger, etc.) therein to face the electrical heaters $R_1$–$R_3$. The upper end of each cover 34 is provided with a retainer 36 for retaining the cover in its closed position.

Figure 5:
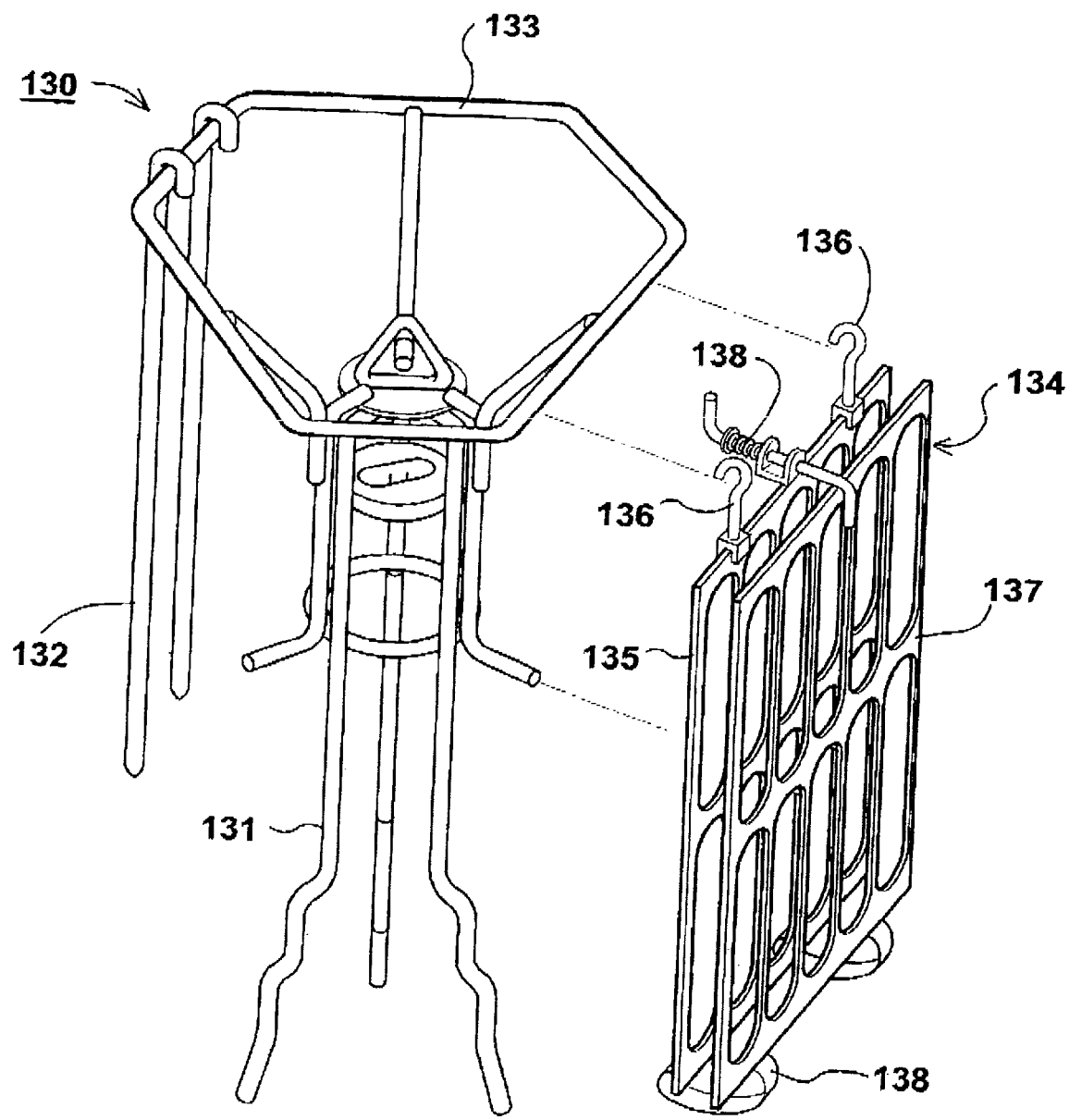
FIG. 5 illustrates another type of cage that may be used for grilling flat-type food articles.

FIG. 5 illustrates another cage structure which may be used. The cage illustrated in FIG. 5, and therein designated 130, is stably supported within the grilling compartment by a stand structure including three central wire legs 131, and three groups of outer wire legs 132 (only one group of which is shown in FIG. 5). This wire stand supports a loop 133 above the floor in the grilling compartment for supporting, in suspension, a plurality of meat-holder cages, only one of which is shown at 134, made of stamped sheet material rather than of wire. Each cage 134 includes a stamped sheet metal plate 135 provided with a pair of hooks 136 at its upper end for hooking onto one side of the central loop 133 for supporting the cage in suspension, and a second metal plate 137 which is movable, as by a sliding movement or a pivotal movement, to its open and closed position with respect to plate 135 for introducing and removing the food articles between the two plates. FIG. 5 illustrates plate 137 movable by sliding movement with respect to plate 135, and includes springs 138 for urging plate 137 towards plate 135 in order to firmly grip the food article between the two plates.

Figure 6:
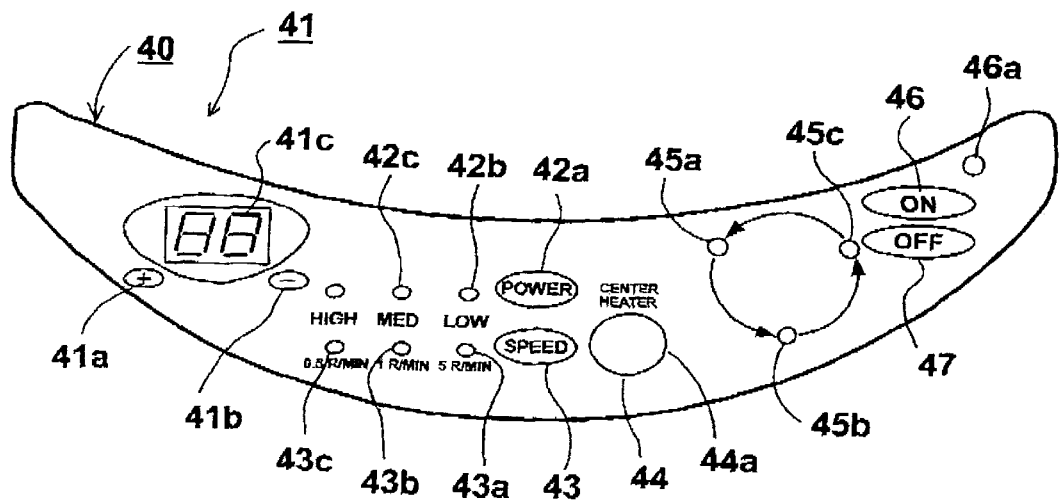
FIG. 6 illustrates one example of a control panel that may be provided on the appliance.

Base 4 further includes a control panel, generally designated 40, enabling the user to program the electrical heater system as desired for the particular type of food article to be grilled. FIG. 6 illustrates one example of a control panel that may be provided on the appliance.

Thus, as shown in FIG. 6, the control panel 40 includes a manually-presettable timer section, generally designated 41, including an Up button 41a for increasing the time, a Down button 41b for decreasing the time, and a display 41c for displaying the preset time period.

Control panel 40 further includes a Power Selector button 42 to preset the degree of heat to be applied to the food articles. For example, one depression of Power Selector button 42 will energize the three electrical heaters $R_1$–$R_3$ (FIG. 2) with Low Power as indicated by indicator 42a; two depressions of button 42 will energize them for Medium power as indicated by indicator 42b; and three depressions of button 42 will energize the heaters for High power as indicated by indicator 42c.

The speed of rotation of the heating front effected by the sequential energization of the electrical heaters is preset by a Speed Selector button 43. For example, one depression of button 43 will sequentially energize the three electrical heaters $R_1$–$R_3$ to produce three rotations of the heating front per minute as indicated by indicator 43a; two depressions of button 43 will produce one rotation of the heating front/minute as indicated by indicator 43b; and three depressions of the button 43 will produce a relatively low rotational speed of the heating front, e.g., 0.5 rotations/minute, as indicated by indicator 43c.

The energization of the center heater $R_4$ is controlled by button 44, and is indicated by indicator 44a.

Control panel 40 further includes an indicator arrangement generally designated 45, to visually indicate the rotation of the heating front produced by the sequential energization of heaters $R_1$–$R_3$. Thus, indicator arrangement 45 includes three indicators 45a–45c, one for each of the heaters $R_1$–$R_3$. The three indicators 45a–45c are arranged in a circular array and are energized when the respective heaters are energized, to thereby display to the viewer the energization state of each of the heaters and the rotation of the heating front produced by their sequential energization.

Control panel 40 further includes a Start/Pause button 46 to energize or deenergize the electrical heaters, which button also controls an On/Off indicator 46a; and a Cancel button 47, to clear all the inputs made via the control panel 40.

Figure 7:
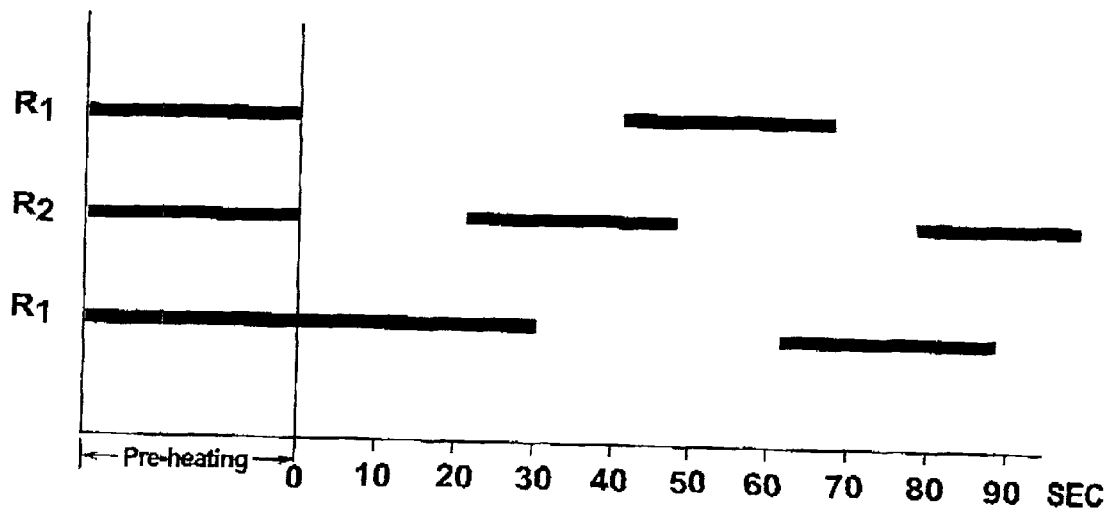
FIG. 7 illustrates an example of one cycle of operation of the peripheral heaters in the grilling appliance.

FIG. 7 illustrates an example of one cycle of operation of the peripheral heaters $R_1$–$R_3$ when the Speed selector 43 is set for one rotation/minute. Thus, as shown in FIG. 6, all three $R_1$–$R_3$ are initially energized to preheat the grilling compartment to a preset temperature, e.g., 400° C. When this temperature is reached, as sensed by a temperature sensor (not shown), this starts the cycle.

At the start of the cycle, heater $R_1$ remains energized, whereas heaters $R_2$ and $R_3$ are deenergized. Twenty seconds after the start of the cycle, heater $R_2$ is energized; thirty seconds after the start of the cycle, heater $R_1$ is deenergized; forty seconds after the start of the cycle, heater $R_3$ is energized; and fifty seconds after the start of the cycle, heater $R_2$ is deenergized. The cycle is completed after sixty seconds, whereupon heater $R_1$ is again energized, while heater $R_3$ remains energized for ten seconds after the start of the second cycle.

It will thus be seen that the three heaters $R_1$–$R_3$ are sequentially energized, but each heater remains energized for a predetermined interval (ten seconds in this case) after the energization of the next heater, so that there is an overlapping period during which two adjacent heaters are energized. Such an energization sequence produces a rotating heating front that rotates one complete revolution each sixty seconds, in the example described.

In most cases, the center heater $R_4$ would remain energized for the complete grilling period. Each heater has three levels of energization (High, Medium, Low) selected by the Power Selector button 42. The sequential energization of the heaters $R_1$–$R_4$ is indicated by the circular array of indicators 45a–45c.

While the invention has been described with respect to one preferred embodiment, it will be appreciated that this is set forth merely for purposes of example, and that many other variations, modifications and applications of the invention may be made.

What is claimed is:

1. A grilling appliance, comprising:
   a housing defining an internal grilling compartment for receiving food articles to be grilled;
   an impaling member mounted within said grilling compartment for impaling a food article to be grilled;
   a circular array of electrical heaters surrounding and spaced from said impaling member for heating a food article when impaled thereon;
   and an electrical system for sequentially energizing said electrical heaters to produce a rotating heating front which rotates around a food article when impaled on the impaling member;
   each of said electrical heaters being shaped in the form of a loop extending for a part of the circumference of said grilling compartment and having a pair of parallel mounting legs at one end joined by a U-section at the opposite end.

2. The grilling appliance according to claim 1, wherein each of said electrical heaters is vertically mounted to said housing with its pair of mounting legs located at the lower end, and its U-section at the upper end, of the respective electrical heater.

3. The grilling appliance according to claim 2, wherein each of said electrical heaters further includes an intermediate section joining the legs and U-section of the respective electrical heater and extending in the circumferential direction outwardly of the legs on both sides of the respective electrical heater.

4. The grilling appliance according to claim 1, wherein each of said electrical heaters is an electrical resistance-heating element.

5. The grilling appliance according to claim 1, wherein there are three of said electrical heaters uniformly spaced around said grilling compartment.

6. The grilling appliance according to claim 1, wherein the appliance further includes a plurality of indicators, one for each of said electrical heaters, arranged in a circular array and energized with its respective electrical heater to thereby display said rotating heating front.

7. The grilling appliance according to claim 1, wherein said appliance includes a further electrical heater centrally of said impaling member, and a wire mounting member having a plurality of radially-projecting legs around said further electrical heater for receiving the impaling member and for spacing same from said further electrical heater.

8. The grilling appliance according to claim 6, wherein said mounting member legs extend parallel to said further electrical heater and are fixed at their lower ends to a drip pan.

9. The grilling appliance according to claim 6, wherein said impaling member is of cylindrical configuration, open at one end for application over said further electrical heater and mounting member, and closed at the opposite end for insertion into the food article to be grilled.

10. The grilling appliance according to claim 9, wherein said opposite end of the impaling member is closed by a metal cap.

11. The grilling appliance according to claim 1, wherein said appliance further includes a cage removably mounted within said grilling compartment, in place of said impaling member, for receiving relatively flat-type food articles to be grilled.

12. The grilling appliance according to claim 11, wherein said cage includes a plurality of compartments arrayed around the circumference of said cage facing the circular array of electrical heaters, each of said compartments being configured to receive a flat-type food article and including a wall movably mounted to open and closed positions to permit introduction and removal of food articles therefrom.

13. The grilling appliance according to claim 12, wherein said cages are supported in suspension from a wire loop at the upper end of a wire stand removably received in said grilling compartment.

14. A grilling appliance, comprising:
a housing defining an internal grilling compartment for receiving food articles to be grilled;
an impaling member mounted within said grilling compartment for impaling a food article to be grilled;
a circular array of electrical heaters surrounding and spaced from said impaling member for heating a food article when impaled thereon;
an electrical system for sequentially energizing said electrical heaters to produce a rotating heating front which rotates around a food article when impaled on the impaling member;
a further electrical heater centrally of said impaling member;
and a mounting member having a plurality of radially-projecting legs around said further electrical heater for receiving the impaling member and for spacing same from said further electrical heater.

15. The grilling appliance according to claim 14, wherein a drip pan is fixed to the lower end of said mounting member.

16. The grilling appliance according to claim 14, wherein said mounting member legs extend parallel to, and for the complete length of, said further electrical heater.

17. The grilling appliance according to claim 14, wherein said impaling member is of cylindrical configuration, open at one end for application over said further electrical heater and spacer member, and closed at the opposite end by a cap insertable into the food article to be grilled.

18. A grilling appliance, comprising:
a housing including a circular array of electrical heaters defining an internal grilling compartment for receiving a food articles to be grilled;
an electrical system for energizing said electrical heaters;
and a cage removably mounted within said grilling compartment for receiving flat-type food articles to be grilled, said cage including a plurality of circumferentially-arrayed compartments facing said electrical heaters, each compartment being configured to receive a flat-type food article and including a wall movable to open and closed positions to permit introduction and removal of the respective food article therefrom.

19. The grilling appliance according to claim 18, wherein there is a further electrical heater centrally of said wire cage.

20. The grilling appliance according to claim 18, wherein said electrical system energizes all said electrical heaters until a predetermined pre-heating temperature is reached, and then sequentially energizes said electrical heaters to produce a rotating heating front which rotates around said wire cage.

* * * * *